United States Patent
Sepúlveda Gonzalez et al.

(10) Patent No.: US 12,173,692 B2
(45) Date of Patent: Dec. 24, 2024

(54) METHOD OF OPERATING A WIND TURBINE AND CONTROL SYSTEM

(71) Applicant: Siemens Gamesa Renewable Energy Innovation & Technology S.L., Sarriguren (ES)

(72) Inventors: Miguel Ángel Sepúlveda Gonzalez, Madrid (ES); Mikel Tapia Pascal, Navarra (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 0 days.

(21) Appl. No.: 17/918,231

(22) PCT Filed: Apr. 16, 2021

(86) PCT No.: PCT/EP2021/059850
§ 371 (c)(1),
(2) Date: Oct. 11, 2022

(87) PCT Pub. No.: WO2021/209579
PCT Pub. Date: Oct. 21, 2021

(65) Prior Publication Data
US 2023/0141320 A1    May 11, 2023

(30) Foreign Application Priority Data
Apr. 16, 2020   (EP) .................................... 20382305

(51) Int. Cl.
*F03D 7/00* (2006.01)
*F03D 7/02* (2006.01)
(Continued)

(52) U.S. Cl.
CPC ........... *F03D 7/028* (2013.01); *F03D 7/0224* (2013.01); *F03D 7/0276* (2013.01); *F03D 9/25* (2016.05);
(Continued)

(58) Field of Classification Search
CPC ...... F03D 7/028; F03D 7/0224; F03D 7/0276; F03D 9/25; H02P 9/007; H02P 9/105;
(Continued)

(56) References Cited

U.S. PATENT DOCUMENTS 4,994,684 A * 2/1991 Lauw ........................ H02P 9/42
290/40 C
5,798,631 A * 8/1998 Spee ....................... F03D 7/046
322/29
(Continued)

OTHER PUBLICATIONS

Anca D Hansen et al: "Control of variable speed wind turbines with doubly-fed induction generators"; Wind Engineering; vol. 28; No. 4; Jan. 1, 2004; pp. 411-432; XP002559984; ISSN: 0309-524X, DOI: 10.1260/0309524042886441.
(Continued)

*Primary Examiner* — Julio C. Gonzalez
(74) *Attorney, Agent, or Firm* — Schmeiser, Olsen & Watts LLP (57) ABSTRACT

A method of operating a wind turbine wherein the wind turbine includes a doubly-fed induction generator that converts rotational mechanical power to electrical power. The method includes operating the wind turbine in a first operational mode in which a speed of a rotor of the wind turbine is controlled to maximize the power generation by the wind turbine. Upon a monitored parameter reaching or dropping below a respective threshold, the wind turbine is operated in a second operational mode. The monitored parameter may include at least one of the rotational speed of the rotor, the rotational speed of the doubly-fed induction generator, a
(Continued)

wind speed, an active electrical power, or generator torque. Operating the wind turbine in the second operational mode may include increasing the rotational speed of the doubly-fed induction generator at the expense of the generation of active electrical power by the power generating system.

12 Claims, 5 Drawing Sheets

(51) Int. Cl.
| | |
|---|---|
| F03D 9/25 | (2016.01) |
| H02P 9/00 | (2006.01) |
| H02P 9/10 | (2006.01) |
| H02P 101/15 | (2016.01) |
| H02P 103/10 | (2016.01) |

(52) U.S. Cl.
CPC . *F05B 2220/706* (2013.01); *F05B 2270/1033* (2013.01); *H02P 9/007* (2013.01); *H02P 9/105* (2013.01); *H02P 2101/15* (2015.01); *H02P 2103/10* (2015.01)

(58) Field of Classification Search
CPC .............. H02P 2101/15; H02P 2103/10; F05B 2220/706; F05B 2270/1033; F05B 2220/70646; H02J 2300/28; Y02E 10/72
See application file for complete search history.

(56) References Cited

U.S. PATENT DOCUMENTS

| | | | |
|---|---|---|---|
| 9,541,053 B2 * | 1/2017 | Spooner | F03B 13/10 |
| 9,856,857 B2 * | 1/2018 | Vitale | F03D 7/046 |
| 2007/0018457 A1 * | 1/2007 | Llorente Gonzalez | ..................... F03D 7/028 290/44 |
| 2011/0089693 A1 * | 4/2011 | Nasiri | F03D 7/0272 290/44 |

OTHER PUBLICATIONS

Han, Yang: "Reactive power capabilities of DFIG-based wind park for low-voltage ri de-through ( LVRT) performance", 2013 International Conference on Quality, Reliability, Risk, Maintenance, and Safety Engineering (QR2MSE), IEEE, Jul. 15, 2013, pp. 1992-1996, XP032498663, DOI: 10.1109/QR2MSE.2013.6625971.
PCT-ISR, Date of mailing: Jul. 1, 2021, International application No. PCT/EP2021/059850, International filing: Apr. 2021, Applicant's or agent's file reference 2020P02919WO, 14 pages.

* cited by examiner

METHOD OF OPERATING A WIND TURBINE AND CONTROL SYSTEM

CROSS-REFERENCE TO RELATED APPLICATIONS

This application claims priority to PCT Application No. PCT/EP2021/059850, having a filing date of Apr. 16, 2021, which claims priority to EP Application No. 20382305.9, having a filing date of Apr. 16, 2020, the entire contents both of which are hereby incorporated by reference.

FIELD OF TECHNOLOGY

The following relates to a method of operating a wind turbine that comprises a power generating system including a doubly-fed induction generator (DFIG). The following further relates to a control system for controlling the operation of such wind turbine and to a respective computer program.

BACKGROUND

Variable speed wind turbines comprise a generator that converts mechanical power provided by the rotating shaft of the wind turbine into electrical power, the frequency of which is adjusted to the grid frequency by means of a power converter (abbreviated as 'converter' herein). For example, wind turbines can be equipped with a doubly-fed induction generator (DFIG). The stator of such DFIG is connected to the grid without any intervening frequency converter (it is generally coupled to the grid via a transformer), whereas the rotor of the DFIG is connected via the power converter. Such configuration has several benefits. Only a fraction of the produced electrical power needs to be handled by the power converter, thus reducing its size and costs and making the power generation more efficient. Also, the generator itself is generally more cost-efficient than a permanent magnet generator (PMG) used in a full converter topology in which the power converter manages the total active power generated by the wind turbine and thus acts as an interface between the generator and the grid.

Wind turbines are generally operated so as to extract the maximum energy from the available wind. In particular, the power that the wind turbine can extract is maximal for a certain value of the rotor speed, which corresponds to an optimum tip speed ratio. A power coefficient can be specified that depends on the tip speed ratio and the pitch angle with which the blades of the rotor of the wind turbine are pitched. Maximum power can be extracted from the wind at the maximum power point at which the power coefficient CP is maximal, which is generally at the optimum tip speed ratio and a pitching angle at which the blades are pitched for maximum aerodynamic efficiency (generally 0° pitch). During operation, it is thus desirable to operate the wind turbine at this maximum power point in order to maximize the production of electrical power, in particular up to the nominal wind speeds at which nominal power is produced by the wind turbine.

Figure 1:
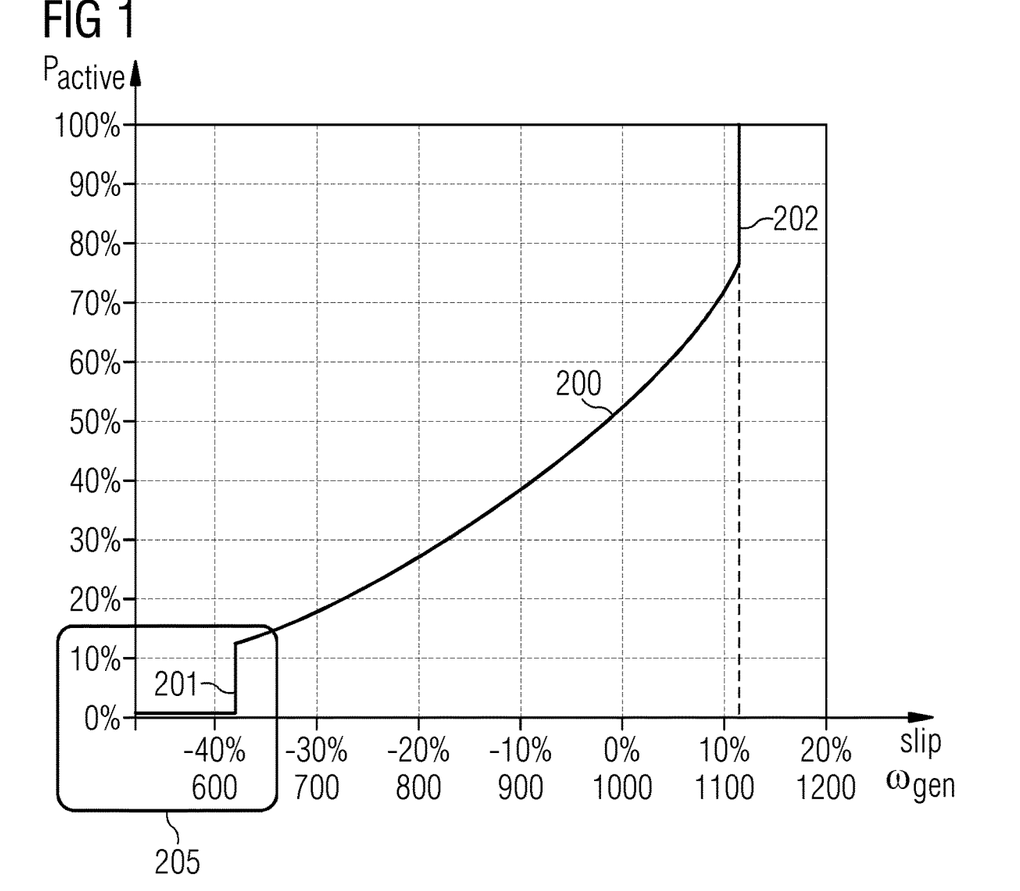
FIG. 1 is a schematic diagram showing a control curve for controlling the operation of a wind turbine so as to maximize power production.

To allow such operation at which maximum power is extracted, it is known to operate the wind turbine by using a maximum power point tracking (MPPT) control algorithm. Different implementations of such MPPT control are known, such as tip speed ratio (TSR) control, power signal feedback (PSF) control, optimal torque (OT) control or hill climb search (HCS) control. An exemplary control curve for such operation is illustrated in FIG. 1. FIG. 1 shows the active power generation by the generator of the wind turbine in dependence on the generator speed, which corresponds to a certain generator slip for the doubly-fed induction generator (0% slip corresponds to the synchronous generator speed). The control of the wind turbine is configured such that as the wind conditions change, the operating point of the wind turbine is kept on the control curve. The converter, in particular the generator side converter thereof, can for example control the output power (or equivalently the torque) of the generator by controlling the rotor current in the rotor of the doubly-fed induction generator.

Recently, the requirements with respect to the providing of reactive power by such wind turbines become more and more stringent. The grid code in particular requires the wind turbine or wind farm to provide a certain amount of reactive power when requested. When operating a wind turbine comprising a doubly-fed induction generator in the above described way, it is however difficult to provide the required reactive power, i.e. to generate or to consume the required amount of reactive power. In particular in low wind conditions, the rotational speed of the generator is low and the capability to provide reactive power is significantly reduced. On the other hand, wind turbines operate during a significant amount of time in such lower wind conditions and thus in conditions in which the reactive power capacity is quite low.

This can result in the problem that such wind turbine may not be allowed to be grid connected, as it may not be able to fulfill the respective grid code.

This problem has been solved in the past by providing wind turbines with a full converter topology in which a converter is coupled between the generator and the grid and converts all of the produced electrical power. Such type of wind turbine can maintain its reactive power capability over most of the range of generator speeds. It however suffers from a reduced efficiency, as all of the produced electrical power has to be converted, and furthermore from increased costs and complexity of the power converter. The providing of additional compensation equipment is a further known solution, but it suffers from similar deficiencies.

The document "Reactive power capabilities of DFIG-based wind park for low-voltage ride-through (LVRT) performance", HAN YANG, 2013 INTERNATIONAL CONFERENCE ON QUALITY, RELIABILITY, RISK, MAINTENANCE, AND SAFETY ENGINEERING (QR2MSE), IEEE, 15 Jul. 2013 (2013-07-15), pages 1992-1996, describes principles and control schemes for a DFIG-based wind park and its reactive power capabilities for low-voltage ride-through performance. The focus of the document is directed at the fault ride through (FRT) capability and the voltage support to be provided by the wind turbines during fault.

The document "Control of variable speed wind turbines with doubly-fed induction generators", ANCA D HANSEN ET AL, WIND ENGINEERING, vol. 28, no. 4, pages 411-432, describes a control method for variable speed pitch controlled wind turbines with doubly-fed induction generators (DFIG), whose objectives are to control the power drawn from the wind turbine in order to track the wind turbine maximum operation point, to limit the power in case of large wind speeds and to control the reactive power interchanged between the wind turbine generator and the grid.

SUMMARY

Accordingly, there is a need to mitigate at least some of the drawbacks mentioned above and in particular to enhance the capability of such wind turbine including a doubly-fed induction generator to provide reactive power, also at low wind speeds.

According to an embodiment of the invention, a method of operating a wind turbine is provided. The wind turbine comprises a power generating system including a doubly-fed induction generator that converts rotational mechanical power to electrical power. The method comprises operating the wind turbine in a first operational mode in which a speed of a rotor of the wind turbine is controlled so as to maximize the power generation by the wind turbine and, upon a monitor parameter reaching or dropping below a respective threshold, operating the wind turbine in a second operational mode. The monitored parameter includes at least one of the rotational speed of the rotor, the rotational speed of the generator, a wind speed, an active electrical power produced by the doubly-fed induction generator or generator torque, i.e. the electromagnetic torque applied by the DFIG. Operating the wind turbine in the second operational mode comprises increasing the rotational speed of the doubly-fed induction generator at the expense of the generation of active electrical power by the power generating system. In particular, the active electrical power output of the generator is reduced when increasing the rotational speed of the generator.

In the first operational mode, to maximize the power generation by the wind turbine, the wind turbine is in particular operated at a maximum aerodynamic efficiency for the given wind speed, in particular such that the power captured or extracted from the wind is maximized, so that electrical power generation is maximized. Respective control schemes are commonly known, for example maximum power point tracking (MPPT). Accordingly, in the second operational mode, the operating point moves away from such maximum aerodynamic efficiency, which occurs at the expense of power capture and thus of active power generation. The second operational mode may however achieve a number of benefits. At low generator speeds, the generator operates further away from the synchronous generator speed, which requires higher currents in the rotor of the generator to maintain the power generation. Furthermore, the voltages in the rotor of the generator increase. The providing of reactive power by the power generation system is likewise associated with a voltage increase in the rotor. Both, the generator rotor and the converter of the power generation system have voltage limits within which they are operable. The capability of the generator to provide reactive power at low rotational speeds is thus significantly reduced. In the second operational mode, the rotational speed of the generator is increased at the expense of active power generation. Accordingly, currents and voltages in the generator rotor can be reduced and can be maintained at a lower level. The capability of the power generation system to provide reactive power is thus increased significantly. In particular, the operation of the power generation system can be maintained in an area in which the reactive power generation capability is not reduced even if wind speeds drop and only lower amounts of active electrical power are produced. Consequently, the reactive power providing capability can be maintained over most of the operating range of the power generation system.

By implementing such second operational mode, it thus becomes possible to meet the more stringent grid code requirements and in particular the required reactive power capabilities. The power generating system is thus enabled to provide a sufficient amount of reactive power without requiring additional compensation equipment, such as STAT-COMs, capacitor banks or the like. Cost and complexity of the system can thus be kept relatively low. Furthermore, compared to full converter topologies, which are capable of providing respective amounts of reactive power, the power generation system has a higher efficiency as only a fraction of the generated electrical power is passed through a converter.

Reaching the threshold may in particular refer to reaching the threshold from above, i.e. from higher values of the monitored parameter. The method may in particular include the monitoring of the respective parameter, the comparing of the monitored parameter to the respective threshold, and, if the respective threshold is reached (in particular from above, i.e. from higher values) or exceeded (by the monitored parameter dropping below the threshold), discontinuing the operation in the first operational mode and starting operation in the second operational mode.

The generator is generally coupled to the wind turbine rotor via a gearbox, so that the rotational speed of the generator and of the wind turbine rotor are equivalent quantities. Furthermore, the generator torque is related to the active electrical power produced by a generator via rotational speed of the generator, so that these quantities are also equivalent. In the first operational mode, as the wind speed changes, the operating point of the wind turbine and the power generation system generally moves along a pre-defined curve with changes in wind speed that relate the rotational speed of the generator to the produced active electrical power. Therefore, these quantities are likewise related to each other. Accordingly, the different possibilities of implementing the monitored parameter that is monitored in the first operational mode can all provide a respective indication that the generator operates in a low-speed regime in which the reactive power providing capability may be reduced. The threshold for the respective monitored parameter may accordingly be set such that a reduction of the reactive power providing capability is avoided. In an embodiment, the threshold is set such that it corresponds to an operation of the doubly-fed induction generator at a speed lower than the synchronous rotational speed of the doubly fed induction generator.

As an example, the threshold may correspond to a value of a power output of the doubly-fed induction generator that is equal to or less than 30%, 25% or even 20% of a nominal active electrical power output of the doubly-fed induction generator. An active power output below such value generally indicates that the generator is operating in a regime in which the reactive power providing capability starts to decrease.

As another example, the doubly-fed induction generator may have a synchronous rotational speed, and the threshold may correspond to a rotational speed of the doubly-fed induction generator that is at least 25% lower, at least 30%, 33% or even 35% lower than the synchronous rotational speed of the doubly-fed induction generator. Such threshold for the rotational speed of the generator may for example be set at or close to a cut-in rotational speed of the generator.

As another example, when operating in the first operational mode, the capability of the doubly-fed induction generator to provide reactive power may decrease below a predetermined rotational speed of the doubly-fed induction generator. The threshold may correspond to a rotational speed of the doubly-fed induction generator that lies within a range of 20% below and 20% above the predetermined rotational speed, 10% below and 10% above such predetermined rotational speed. Accordingly, by choosing such threshold, it may be ensured that over most of the operational range of the wind turbine, the active power generation is maximized while when reaching such predetermined rotational speed below which the reactive power providing capability is reduced, operation changes into the second operational mode so that such reduction can be avoided.

For example, in the second operational mode, the rotational speed of the doubly-fed induction generator may be increased to a value that is higher than such predetermined rotational speed. Accordingly, the reactive power providing capability can be maintained or restored.

It should be clear that the different thresholds may also be combined, i.e., more than one parameter and associated threshold may be monitored and the reaching or exceeding of such threshold may cause the changing of the operation into the second operational mode.

The rotational speed of the doubly-fed induction generator may in particular be increased in the second operational mode to a value that is higher than 30% below the synchronous rotational speed of the doubly-fed induction generator, higher than the value of 28% or even 25% below the synchronous rotational speed.

As an example, if the synchronous rotational speed is about 1.000 rpm, the rotational speed may be increased in the second operational mode to a value above 700 rpm. (For example, assuming a threshold at or below 650 rpm.)

In the first operational mode, below a predetermined active power output, the capability of the power generating system to generate reactive power decreases.

In an embodiment, in the second operational mode, the rotational speed of the doubly-fed induction generator is increased by controlling the pitch of blades of the wind turbine rotor so as to increase the rotational speed of the wind turbine rotor, and/or by decreasing a set point for the torque or output power of the generator. For example, a speed control unit may be provided that controls the rotational speed of the generator rotor, and that may operate the wind turbine in the second operational mode with an adjusted speed set point such that the rotational speed of the rotor and thus of the generator is increased.

It should be clear that as the output power of the generator or the generator torque are decreased, the rotational speed likewise increases. For example, the power generating system may comprise a generator side converter, and the generator side converter may be coupled to a rotor of the doubly-fed induction generator. The generator side converter is configured to control the output power and/or the torque of the generator by controlling a current in the rotor of the generator.

In the first operational mode, the wind turbine is controlled by adjusting the rotational speed and the blade pitch so as to maximize the aerodynamic efficiency. In particular, the rotational speed of the wind turbine rotor may be adjusted for an optimal tip speed ratio. The blade pitch may be adjusted to a value of 0° when operating below the nominal wind speed/rated wind speed, and the blade pitch may be controlled above the rated wind speed to keep the rotational speed constant. In particular, the rotational speed and the blade pitch may be controlled such that a maximum value of the power coefficient CP is achieved, i.e., that the wind turbine is operated at the maximal power point.

In the first operational mode, the wind turbine may be operated in accordance with a control curve that relates to the rotational speed of the generator to the active electrical power output of the generator or to generator torque. The power generating system and the blade pitch may be controlled in the first operational mode such that the operating point of the wind turbine lies on the control curve. The control curve may in particular be a maximum power curve that corresponds to the maximal power point for different wind speeds. Accordingly, during operation, as the wind speed changes, the operating point moves along the control curve in dependence on the wind speed. The control system is configured to keep the operating point on the control curve. Such control curve may for example be implemented as a look-up table using the actual rotational speed and the actual active electrical power output as an input and determining a set point for the active power output. Other implementations of such control are certainly conceivable.

The control curve may for example be shaped such that at a predefined cut-in rotational speed, the rotational speed of the generator is held constant while the output power or torque is varied as the wind speed varies. Above such cut-in rotational speed, the maximum power point is tracked. Accordingly, the distance of the rotational speed to the synchronous rotational speed of the generator thus does not become larger than the cut-in rotational speed. The control curve may further be shaped such that at a predefined nominal rotational speed of the generator, the rotational speed of the generator is held constant, whereas below the nominal rotational speed of the generator, a maximum power point is tracked. The generator does accordingly not rotate faster than the nominal rotational operating speed. A typical value of such nominal rotational speed is 1.12 times the synchronous rotational speed. Between the cut-in rotational speed and the nominal rotational speed, the maximum power point is thus tracked. When the generator operates at the nominal rotational speed, and the wind speed further increases, the blades are pitched out to maintain the rotational speed and the nominal power production (up to a cut-out wind speed).

In particular, the first operational mode may be a maximum power point tracking, MPPT, control mode in which an operating point at which the capturing (or extraction) of power from the wind by the wind turbine is maximized, is tracked. Several control algorithms are known and may be implemented in such MPPT control mode. Examples are the tip speed ratio (TSR), power signal feedback (PSF), optimal torque (OT), or hill climb search (HCS) control algorithms. These are commonly known and will not be explained in greater detail here.

In the second operational mode, the maximum power point tracking may be disabled and the wind turbine may not be operated at the maximum power point for the respective wind speed. As the maximum power is extracted from the wind at the maximum power point, such operation in the second operational mode is associated with a reduction of the active power production. However, as outlined above, several benefits are achieved with respect to the reactive power providing capability.

The method may further comprise, upon the monitored parameter reaching or exceeding a respective second threshold, presuming operation of the wind turbine in the first operational mode. For example, if the wind speed picks up again, it may become possible again to operate the generator at a speed in the first operational mode at which the reactive power providing capability is not reduced. It should be clear that the second threshold is set for the respective monitored parameter.

In an embodiment, the method may further comprise, upon receiving a respective command, enabling or disabling the second operational mode. Such command may for example be received from a user interface, or from a higher level controller, such as a wind turbine or wind farm controller. An operator may thus select to either activate or deactivate the second operational mode, so as to either maximize the active power production (by deactivating the second operational mode), or so as to maintain the reactive power providing capability (by activating the second operational mode). When the second operational mode is enabled, the respective parameter is monitored and compared to the threshold to determine when to enter the second operational mode, whereas when the second mode is disabled, such monitoring and comparing may not take place.

A further embodiment provides a control system for controlling the operation of a wind turbine, wherein the control system is configured to be coupled to a power generating system of a wind turbine that includes a doubly-fed induction generator. The control system comprises an input for receiving a signal indicative of a monitored parameter, wherein the monitored parameter includes at least one of the rotational speed of a rotor of the wind turbine, a rotational speed of the generator, a wind speed, an active electrical power produced by the doubly-fed induction generator, or generator torque. The control system further comprises an output for providing a control signal for controlling rotational speed of the DFIG e.g., by controlling a pitching angle of a rotor blade of a rotor of the wind turbine and or controlling the output power or torque of the doubly-fed induction generator; and a processing unit configured to perform any of the methods described herein above or further below. By such control system, advantages similar to the ones outlined further above may be achieved.

The control system is further configured to control the active output power and/or torque of the doubly-fed induction generator by controlling a current in a rotor of the doubly-fed induction generator. The control system may additionally or alternatively be configured to control a pitch angle of a blade of the rotor of the wind turbine. The control system may thus be capable of precisely controlling the rotational speed of the wind turbine rotor and thus of the DFIG and of operating the wind turbine using a maximum power point tracking control method.

According to a further embodiment of the invention, a wind turbine comprising a power generating system including a rotor and a doubly-fed induction generator coupled to the rotor is provided. The wind turbine further comprises a control system having any of the configurations described herein.

The power generating system may further include a converter, and the control system may be coupled to such converter and be configured to control such converter. The converter may include a generator side converter that is coupled to a rotor of the doubly-fed induction generator, and the generator side converter may control the output power and/or torque of the generator in accordance with respective set points received from the control system. The control system may include a respective converter controller that provides such control of the converter.

According to a further embodiment of the invention, a computer program product (non-transitory computer readable storage medium having instructions, which when executed by a processor, perform actions) for controlling a wind turbine is provided. The computer program comprises control instructions which, when executed by a processing unit of a wind turbine control system, cause the wind turbine control system to perform any of the methods described herein above or further below. The control instructions may for example be stored on a memory of the processing unit and a microprocessor of the processing unit may execute the control instructions.

According to a further embodiment of the invention, a volatile or non-volatile storage medium or data courier is provided that stores control instructions which, when executed by a processor, cause the processor to perform any of the methods described herein.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein.

DETAILED DESCRIPTION

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

Figure 2:
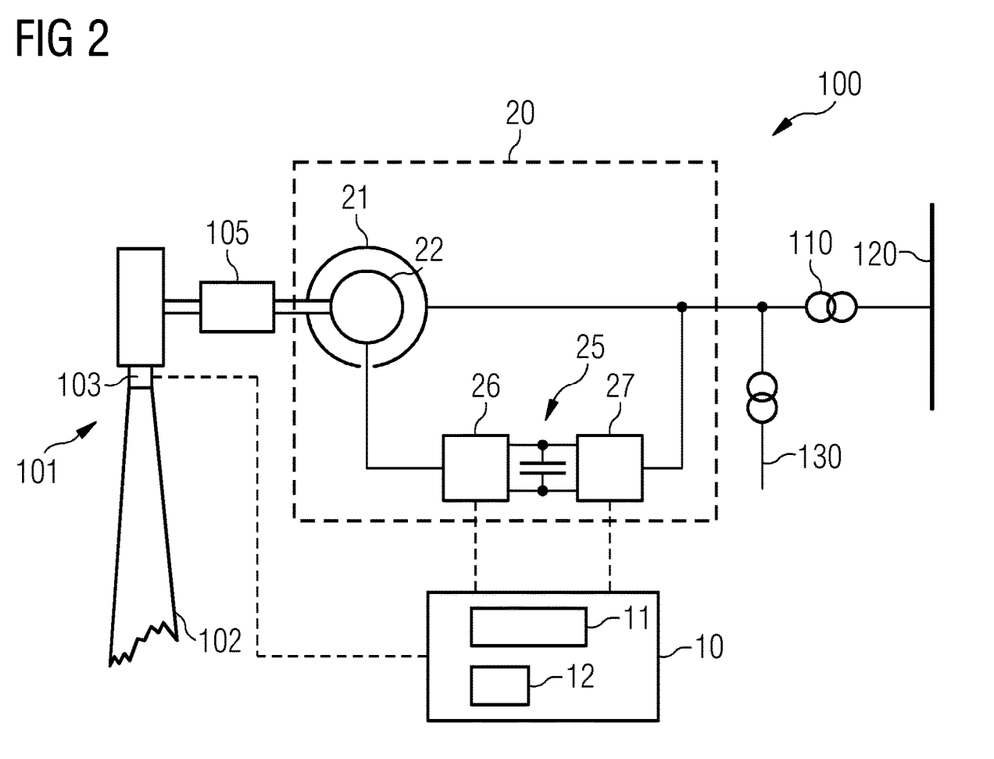
FIG. 2 is a schematic drawing showing a wind turbine including a control system according to an embodiment of the invention.

FIG. 2 illustrates a wind turbine 100 according to an embodiment. The wind turbine 100 includes a rotor 101 with blades 102, for example three blades. A pitch drive mechanism 103 allows the adjustment of the pitch angle of blades 102, so that the amount of wind energy that is converted into rotational mechanical energy of the rotor can be controlled. The rotor 101 is coupled via a gearbox 105 to a doubly-fed induction generator DFIG 21 of a power generating system 20 of the wind turbine. Gearbox 105 translates the slow rotational speed of rotor 101 into a higher rotational speed suitable for power generation via the DFIG 21. The power generating system 20 further comprises a converter 25 including a grid side converter 27 and a generator side converter 26 that are coupled by a DC link. As common for such DFIG systems, the generator side converter 26 is coupled to a rotor of the DFIG 21 and controls the electromagnetic torque or output power of DFIG 21 by controlling the current in the rotor 22 and thus the electromagnetic flux. The converter 25 may for example be controlled by a converter controller, which may be separate or may form part of the control system 10.

As common for such systems, the stator of DFIG 21 is coupled to the wind turbine transformer 110 and the grid side converter 27 is likewise coupled to the transformer 110, which transforms the generated electrical power to a voltage for transmission via power grid 120. Grid 120 can be a local wind farm grid or may a utility grid.

Auxiliary systems 130 may furthermore be coupled to the power generating system 20 to provide additional reactive power. In accordance with embodiments of the present invention, such auxiliary systems 130 may not be required or the size of such auxiliary systems 130 may be reduced.

In the DFIG topology illustrated in FIG. 2, reactive power is provided (i.e., generated or consumed) by the stator of DFIG 21 and the grid side converter 27 and is provided, together with any auxiliary reactive power of the auxiliary system 130, to the grid 120.

It is generally desirable to extract a maximum amount of power from the available wind, and respective control methods have been devised, such as the commonly known maximum power point tracking (MPPT) control methods. The wind turbine is in particular controlled so as to operate as a maximum aerodynamic efficiency, which can for example be achieved by operating the wind turbine in accordance with a power speed curve (also termed control curve or maximum power curve herein) as illustrated in FIG. 1. In FIG. 1, the horizontal axis illustrates the rotational speed $\omega_{gen}$ and the slip of the DFIG 21, whereas the vertical axis indicates the generated active electrical power $P_{active}$. The DFIG has a synchronous rotational speed which in the present example is at 1.000 rpm, and a nominal operating speed which in the present example is at 1.12 times the synchronous rotational speed, i.e., at 1.120 rpm. The respective values for generator slip are 0% and 12%. In accordance with the control curve of FIG. 1, when reaching the nominal rotational speed 202, the rotational speed of the generator is held constant and with increasing wind speeds, the power output is increased up to the nominal power output. As in conventional control systems, at higher wind speeds, the blades are pitched out so as to keep the rotational speed of the generator and the power production at nominal values. At lower wind speeds, the control curve 200 tracks the maximum power point, i.e., the rotational speed of the rotor (and thus of the generator) and the power output of the generator are adjusted so as to keep the operating point of the wind turbine on control curve 200. The maximum power point generally corresponds to the optimum tip speed ratio for the respective wind speed and a pitching angle of the rotor blades of 0% (maximum aerodynamic efficiency). The maximum power points can be determined for the respective wind turbine and can be stored as a respective control curve 200 in the control system 10, for example in form of a look-up table or the like. It should be clear that to effect the control in accordance with control curve 200, wind speed is not required as an input, since for any combination of rotational speed of the generator and generator output, the controller can determine the respective point on control curve 200 at which operation should occur to achieve maximum power output.

Power point tracking occurs at rotational speeds below the nominal rotational speed 202 until at the lower speed end of the control curve 200, a cut-in speed 201 is reached. When the wind speed decreases further, the rotational speed of the generator is kept constant while the output power of the generator is reduced so as to keep the rotational speed constant. As mentioned above, this can occur by controlling the generator side converter 26, which imprints the respective currents on the rotor 22 to achieve the desired torque and thus output power.

The control system 10 is configured to operate the wind turbine 100 in a first operational mode in which the control follows the control curve 200 of FIG. 1. This control mode may for example be a MPPT control mode employing power signal feedback (PSF). It should be clear that other control algorithms may be used in the first operational mode to provide a maximum power output of the wind turbine 100, such as the commonly known tip speed ratio (TSR), optimal torque (OT), hill climb search (HCS) or other control algorithms.

Figure 3:
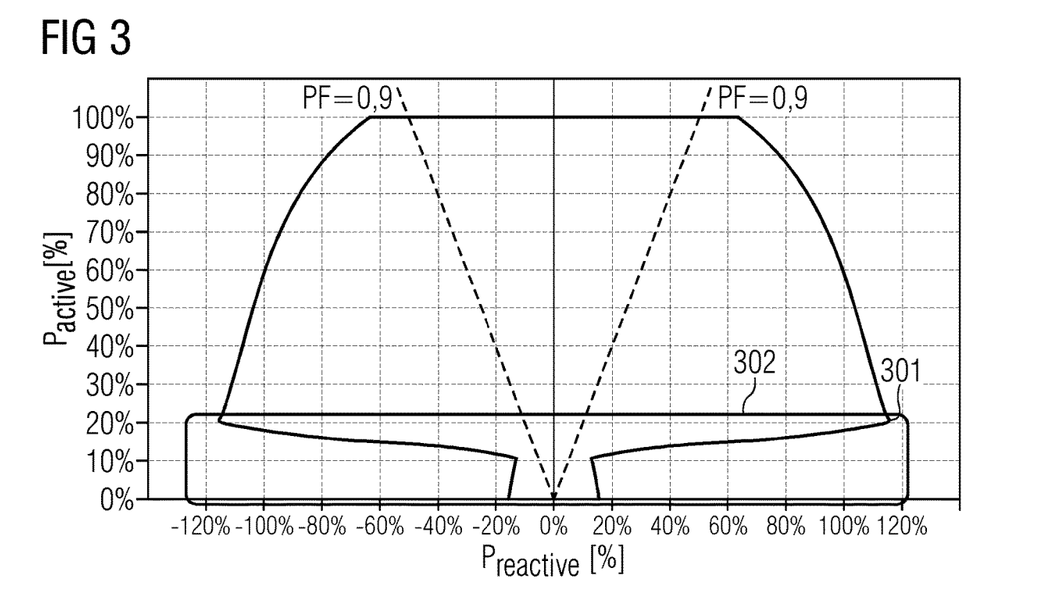
FIG. 3 is a schematic diagram showing the capability of a power generating system of a wind turbine to provide reactive power in dependence on the active power output when operated in a first operational mode.

FIG. 1 illustrates at 205 an area in which the capability of the power generating system 20 to provide reactive power is reduced significantly. This is illustrated in more detail in FIG. 3. FIG. 3 shows on the horizontal axis the reactive power providing capacity of the power generation system 20 at different values of the active electric power output $P_{active}$ shown on the vertical axis. As can be seen, for higher active power production, and thus for higher rotational speeds of the DFIG, a significant amount of reactive power can be provided by the power generating system 20. At lower active power output and thus lower rotational speeds, the capability to provide reactive power is reduced significantly (area 302). In particular, at an active power production for rotational speed below a predetermined point 301, the reactive power providing capability of the power generating system 20 is reduced. In the present example, this reduction starts at an active power output below 20%, yet it should be clear that in other systems, this predetermined point 301 may be at a different level of active power output, corresponding to a respective rotational speed of the generator.

In such area 302, the generator operates in low-speed conditions. When controlling the output power in such low-speed conditions, the distance to the synchronous generator speed is high, corresponding to a highly negative slip operation of the generator. As a result, high voltages are present in the rotor of the DFIG 21. Furthermore, for operation in such low-speed regime, the currents in the rotor of the DFIG 21 are increased significantly. The rotor and the converter 25 have operating limits with respective to voltage and current, so that the capacity to provide additional reactive power is very limited. The providing of reactive power increases the voltage levels in the rotor, so that these voltage limits are reached quickly, resulting in a very limited reactive power capability in this area 302.

The control system 10 now implements a second operational mode in which the wind turbine is operated at an operating point that does not lie on the control curve 200. In particular, when operation reaches the area 302, the rotational speed of the generator is increased in the second operational mode at the expense of the generation of active electrical power, i.e. the power output $P_{active}$ of the DFIG 21 is reduced.

A parameter is monitored and if the parameter reaches or drops below the respective threshold, the control system 10 changes the operational mode from the first operational mode to the second operational mode. It should be clear that different parameters may be monitored to indicate that the operation reaches the area 302 in which the reactive power providing capability is reduced. For example, the rotational speed of the generator (or correspondingly the rotational speed of the rotor 101) may be monitored. Alternatively, the active electrical power produced by the generator 21 may be monitored. As further alternatives, wind speed (which also indicates an operating point on curve 200) or generator torque may be monitored. The respective threshold for the monitored parameter is determined such that it indicates when the region 302 of reduced reactive power capability is reached. The threshold may for example be set within a range of a certain percentage (e.g., 20%, 15% or 10%) above or below the predetermined point 301 for the active power output or the rotational speed below which the reduction in the reactive power capability occurs. In other implementations, it may be set at a rotational speed that is close to or corresponds to the cut-in rotational speed 201 of the generator. As another example, it may be set at a certain active power output of the generator when the generator operates at the cut-in rotational speed 201.

Figure 4:
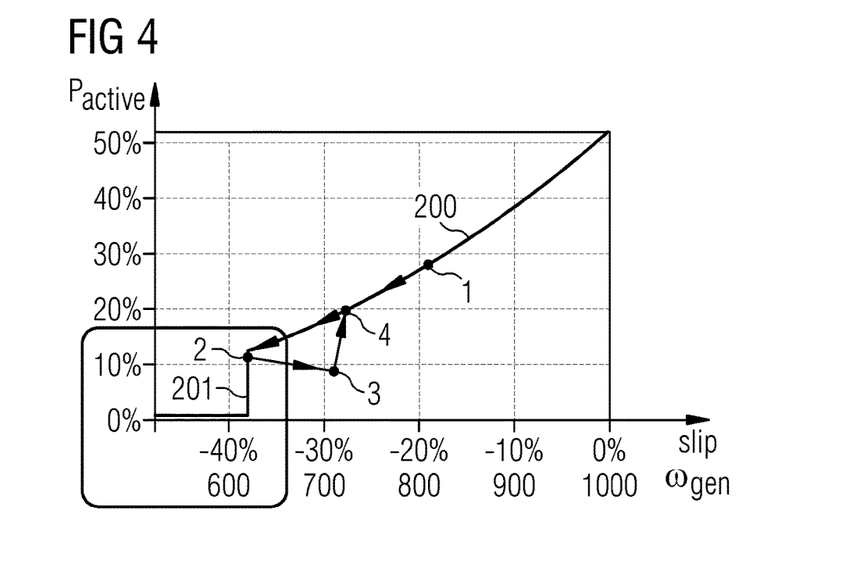
FIG. 4 is a schematic diagram illustrating the control of a wind turbine according to an embodiment of the invention.
Figure 6:
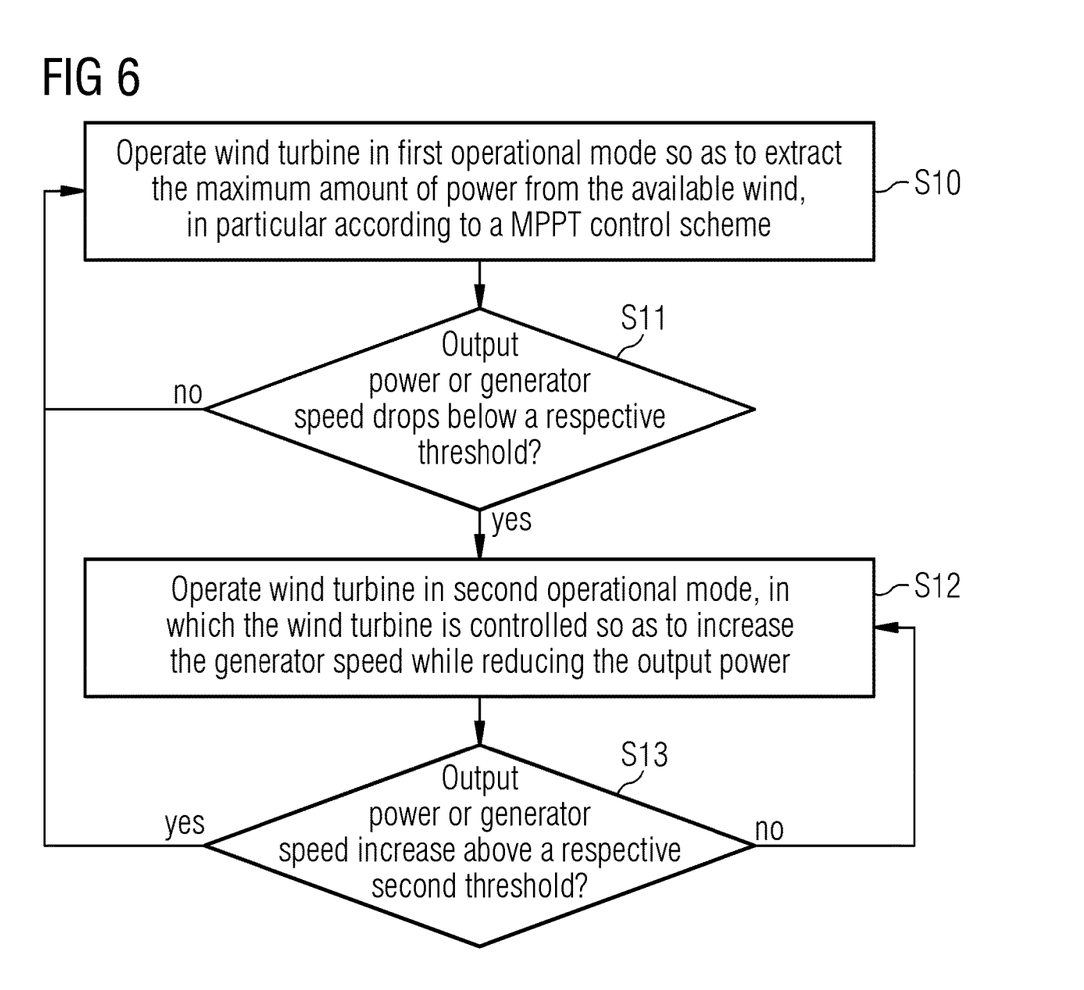
FIG. 6 is a schematic flow diagram illustrating a method according to an embodiment of the invention.

A respective example is illustrated in FIG. 4. The operation of the wind turbine 100 is explained with reference to the flow diagram of FIG. 6. In step S10, the wind turbine 100 is operated in the first operational mode so as to extract or capture the maximum amount of power from the available wind. In particular, the wind turbine is operated in accordance with the control curve 200 using an MPPT control scheme. Point 1 in FIG. 4 corresponds to such operation, wherein the wind speed is below the rated wind speed. In step S11, it is checked if the output power of the generator or the generator speed has dropped below a respective threshold, and if this is not the case, operation is continued in the first mode. If the wind speed is reduced, the control system 10 causes the operating point of the wind turbine to follow the control curve 200, as indicated by arrows in FIG. 4. This continues until the operation reaches point 2 on the curve 200 in FIG. 4, at which the output power drops below the respective threshold, so that decision step S11 of FIG. 6 branches off to step S12. In step S12, the wind turbine is operated in the second operational mode. In the second operational mode, the wind turbine is controlled so as to increase the generator speed while reducing the output power. This is indicated in FIG. 4 by moving the operating point from point 2 to point 3, at which the rotational speed $\omega_{gen}$ is increased while the effective electrical output power $P_{active}$ is slightly reduced. The operating point can thereby be kept above the area 302 illustrated in FIG. 3, so that the reactive power providing capability of the power generating system 20 is improved significantly compared to the conventional control schemes. While the active power output is only reduced slightly, the effect on the reactive power capability is significant, as can be seen in FIG. 3. If wind speed picks up again, the control system can bring the operating point back to the control curve 200, i.e., back to operation at optimal aerodynamic conditions at the maximum power point. For example, a second threshold may be employed for the respective monitored parameter which is selected such that it ensures that if operation on curve 200 is resumed, the operation will occur with sufficient active power output/rotational speed so that it is outside the area 302 of FIG. 3. This is indicated in step S13 of FIG. 6, where the output power or the generator speed is monitored, and if it increases above a respective second threshold, the operation in the first operational mode is resumed (step S10). Otherwise, operation in the second operational mode is continued (step S12).

In FIG. 4, resuming the first operational mode corresponds to moving from point 3 back towards point 4 which lies on the control curve 200. Control then continues along the control curve 200 in accordance with the respective MPPT control algorithm.

Figure 5:
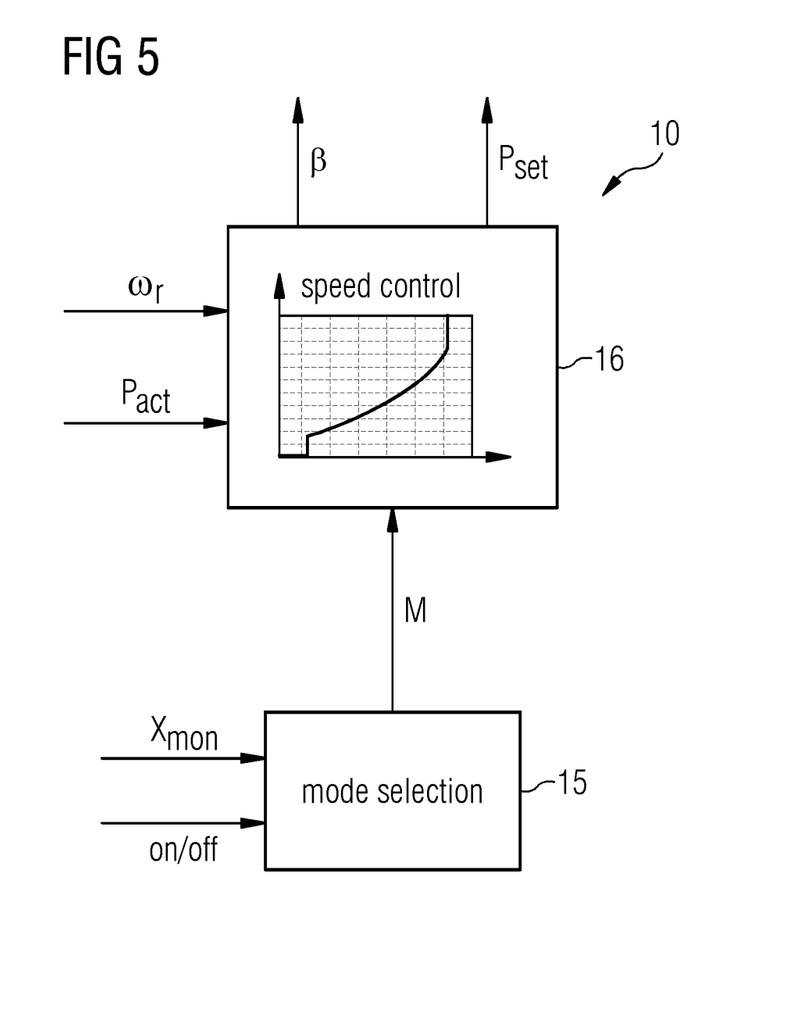
FIG. 5 is a schematic drawing showing components of a control system according to an embodiment of the invention.

An exemplary implementation of the control is illustrated in FIG. 5. A speed control unit 16 is provided with the control curve 200 and receives as input the rotational speed of the generator and the currently produced active electrical power Pact. The speed control unit 16 controls the pitch angle θ of the rotor blades 102 and furthermore controls a power set point $P_{set}$ or a corresponding torque set point for the DFIG 21 via converter 25. Speed control unit 16 maintains the operating point of the wind turbine 100 on the control curve 200 by controlling these parameters in the first operational mode.

A mode selection unit 15 is furthermore provided. Mode selection unit 15 receives as input the monitor parameter $X_{mon}$, which as outlined above can be implemented in different ways, such as the generator rotational speed or generator active output power. Mode selection unit 15 monitors if the parameter reaches or drops below the respective threshold. If this occurs, it instructs the speed control unit 16 to change from the first operational mode into the second operational mode in which the operating point is controlled as described above. Mode selection unit 15 may furthermore monitor if the parameter $X_{mon}$ reaches or exceeds the second threshold and may accordingly command the speed control unit 16 to resume operation in the first operational mode.

Mode selection unit 15 may furthermore receive a control signal for switching on and off the changing into the second operational mode. Mode selection unit 15 may thus essentially be disabled, so that the speed control unit 16 only operates in the first operational mode. This allows an operator to maximize the generation of active electrical power if the reactive power capabilities are not required.

Speed control unit 16 and mode selection unit 15 may for example be implemented as respective computer programs in the control system 10 shown in FIG. 2. The control system 10 may in particular include a processing unit that comprises a microprocessor 11 and a memory 12 coupled thereto. Processor 11 may be a microprocessor, a digital signal processor, an application specific integrated circuit or the like. Memory 12 may include RAM, ROM, volatile and non-volatile memory, flash memory, a hard disc drive and the like. Memory 12 stores control instructions of such program which are executed by the processor 11 and which are configured such that the execution causes the control system 10 to perform any of the methods described herein.

Control system 10 may certainly comprise further components, such as input and output interfaces for measuring the respective parameters and providing control signals to the control entities. It may further include a user interface. It should be clear that the control system 10 can be distributed, it may for example include a processor/memory of a converter controller of converter 25 and a processor/memory of a wind turbine controller, wherein the above-described functionalities can be distributed among such controllers.

By embodiments described herein, in the low-speed operating region of the generator, a significant increase in the reactive power capacity is achieved. The grid can thereby be supported and grid code requirements can be met, while only a small reduction in the active power production is required. Furthermore, the need to install additional compensation equipment, for example at the wind farm level, such as STATCOMs and external capacitor banks for compensating reactive power, is thus reduced or avoided. The power generating system including the DFIG can maintain its reactive power capability down to very low values of active power production, comparable to full converter topologies. At the same time, the efficiency is higher than the one of full converter topologies, since the stator is directly coupled to the grid, without intervening converter. The solution may thus provide advantages over both conventional systems.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating a wind turbine, wherein the wind turbine comprises a power generating system including a doubly-fed induction generator that converts rotational mechanical power to electrical power, wherein the method comprises:
    operating the wind turbine in a first operational mode in which a speed of a rotor of the wind turbine is controlled to maximize the power generation by the wind turbine, wherein the first operational mode is a maximum power point tracking control mode in which an operating point is tracked at which capturing of power from the wind by the wind turbine is maximized; and
    switching from the first operational mode to a second operational mode upon a monitored parameter moving downward and reaching or dropping below a respective threshold from a higher level, and operating the wind turbine in a second operational mode,
    wherein the monitored parameter includes at least one of the rotational speed of the rotor, the rotational speed of the doubly-fed induction generator, a wind speed, an active electrical power produced by the doubly-fed induction generator, or generator torque, and
    wherein operating the wind turbine in the second operational mode comprises increasing the rotational speed of the doubly-fed induction generator at the expense of the generation of active electrical power by the power generating system, wherein in the second operational mode, the maximum power point tracking is disabled and the wind turbine is not operated at the maximum power point for the respective wind speed, and
    wherein the method further comprises:
    resuming operation of the wind turbine in the first operational mode upon the monitored parameter reaching or exceeding a respective second threshold by moving back upward from the respective threshold.

2. The method according to claim 1, wherein the threshold corresponds to a value of a power output of the doubly-fed induction generator that is equal to or less than 30% of a nominal active electrical power output of the doubly-fed induction generator.

3. The method according to claim 1, wherein the doubly-fed induction generator has a synchronous rotational speed, wherein the threshold corresponds to a rotational speed of the doubly-fed induction generator that is at least 25% lower than the synchronous rotational speed of the doubly-fed induction generator.

4. The method according to claim 1, wherein when operating in the first operational mode, the capability of the doubly-fed induction generator to provide reactive power decreases below a predetermined rotational speed of the doubly-fed induction generator, wherein the threshold corresponds to a rotational speed of the doubly-fed induction generator that lies within a range of 20% below and 20% above the predetermined rotational speed.

5. The method according to claim 4, wherein in the second operational mode, the rotational speed of the doubly-fed induction generator is increased to a value that is higher than the predetermined rotational speed.

6. The method according to claim 1, wherein in the second operational mode, the rotational speed of the doubly-fed induction generator is increased by controlling the pitch of blades of the rotor of the wind turbine so as to increase the rotational speed of the rotor of the wind turbine, and/or by decreasing a set-point for the torque or output power of the doubly-fed induction generator.

7. The method according to claim 6, wherein the power generating system comprises a generator side converter, wherein the generator side converter is coupled to a rotor of the doubly-fed induction generator and is configured to control the output power and/or the torque of the doubly-fed induction generator by controlling a current in the rotor.

8. The method according to claim 1, wherein in first operational mode, the wind turbine is controlled by adjusting the rotational speed and the blade pitch so as to maximize the aerodynamic efficiency.

9. The method according to claim 1, wherein in the first operational mode, the wind turbine is operated in accordance with a control curve that relates the rotational speed of the doubly-fed induction generator to an active output power of the doubly-fed induction generator or to generator torque, the power generating system and/or a pitching angle of blades of the rotor of the wind turbine being controlled in the first operational mode such that the operating point of the wind turbine lies on the control curve, and wherein in the second operational mode the wind turbine is operated such that the operating point of the wind turbine does not lie on the control curve.

10. The method according to claim 1, wherein the method further comprises: enabling or disabling the second operational mode in response to a command signal.

11. A computer program product, comprising a computer readable hardware storage device having computer readable program code stored therein, said program code executable by a processor of a computer system to implement a method for controlling a wind turbine, wherein the computer program comprises control instructions which, when executed by a processing unit of a wind turbine control system, cause the wind turbine control system to perform the method of claim 1.

12. A control system for controlling the operation of a wind turbine, wherein the control system is configured to be coupled to a power generating system of the wind turbine that includes a doubly-fed induction generator, the control system comprising:
    an input for receiving a signal indicative of a monitored parameter, wherein the monitored parameter includes at least one of the rotational speed of a rotor of the wind turbine, a rotational speed of the doubly-fed induction generator, a wind speed, an active electrical power produced by the doubly-fed induction generator, or generator torque;
    an output for providing a control signal for controlling a rotational speed of the doubly-fed induction generator; and
    a processing unit configured to perform a method for controlling the operation of the wind turbine, wherein the method comprises operating the wind turbine in a first operational mode in which a speed of a rotor of the wind turbine is controlled to maximize the power generation by the wind turbine, wherein the first operational mode is a maximum power point tracking control mode in which an operating point is tracked at which capturing of power from the wind by the wind turbine is maximized;

switching from the first operational mode to a second operational mode upon the monitored parameter moving downward and reaching or dropping below a respective threshold from a higher level, and operating the wind turbine in a second operational mode, wherein operating the wind turbine in the second operational mode comprises increasing the rotational speed of the doubly-fed induction generator at the expense of the generation of active electrical power by the power generating system, wherein in the second operational mode, the maximum power point tracking is disabled and the wind turbine is not operated at the maximum power point for the respective wind speed; and resuming operation of the wind turbine in the first operational mode upon the monitored parameter reaching or exceeding a respective second threshold by moving back upward from the respective threshold.

* * * * *